(12) United States Patent
Toda et al.

(10) Patent No.: US 7,001,078 B2
(45) Date of Patent: Feb. 21, 2006

(54) ROLLING BEARING UNIT

(75) Inventors: Kazutoshi Toda, Tondabayashi (JP);
Shinichirou Kashiwagi, Yao (JP);
Daisaku Tomita, Kashiwara (JP)

(73) Assignee: Koyo Seiko Co., Ltd.

( * ) Notice: Subject to any disclaimer, the term of this patent is extended or adjusted under 35 U.S.C. 154(b) by 0 days.

(21) Appl. No.: 10/267,501

(22) Filed: Oct. 9, 2002

(65) Prior Publication Data
US 2003/0072511 A1   Apr. 17, 2003

(30) Foreign Application Priority Data
Oct. 15, 2001   (JP)   ............................ P2001-316536
Oct. 8, 2002   (JP)   ............................ P2002-294785

(51) Int. Cl.
*F16C 19/00*   (2006.01)

(52) U.S. Cl. ........................ 384/544; 384/492; 384/625

(58) Field of Classification Search ................ 384/492, 384/625, 544, 569
See application file for complete search history.

(56) References Cited

U.S. PATENT DOCUMENTS

| | | | |
|---|---|---|---|
| 4,871,268 A * | 10/1989 | Furumura et al. | 384/492 |
| 5,030,017 A * | 7/1991 | Murakami et al. | 384/492 |
| 5,137,375 A * | 8/1992 | Murakami et al. | 384/450 |
| 5,292,200 A * | 3/1994 | Matsumoto et al. | 384/492 |
| 5,413,643 A * | 5/1995 | Murakami et al. | 148/319 |
| 5,422,524 A * | 6/1995 | Nakamura et al. | 310/90 |
| 5,447,579 A * | 9/1995 | Hirakawa et al. | 148/320 |
| 5,860,749 A * | 1/1999 | Hirakawa et al. | 384/492 |
| 6,095,692 A * | 8/2000 | Takemura | 384/492 |
| 6,113,279 A * | 9/2000 | Sawai et al. | 384/537 |
| 6,143,425 A * | 11/2000 | Tanaka et al. | 428/627 |
| 6,217,220 B1 * | 4/2001 | Ohkuma et al. | 384/489 |

* cited by examiner

*Primary Examiner*—Thomas R. Hannon
(74) *Attorney, Agent, or Firm*—Jordan and Hamburg LLP

(57) ABSTRACT

A rolling bearing unit includes a shaft body, an inner ring mounted on the shaft body, an outer ring concentric with the inner ring, and a plurality of balls between the inner ring and the outer ring. A caulking portion to be caulked onto the outer end face of the inner ring is formed on the shaft body. A pre-load is applied to the balls to fix the inner ring to the shaft body. The retained austenite amount of an edge of the inner ring in the vicinity of the caulking portion is between 3% or more and 20% or less.

20 Claims, 3 Drawing Sheets

F I G. 4
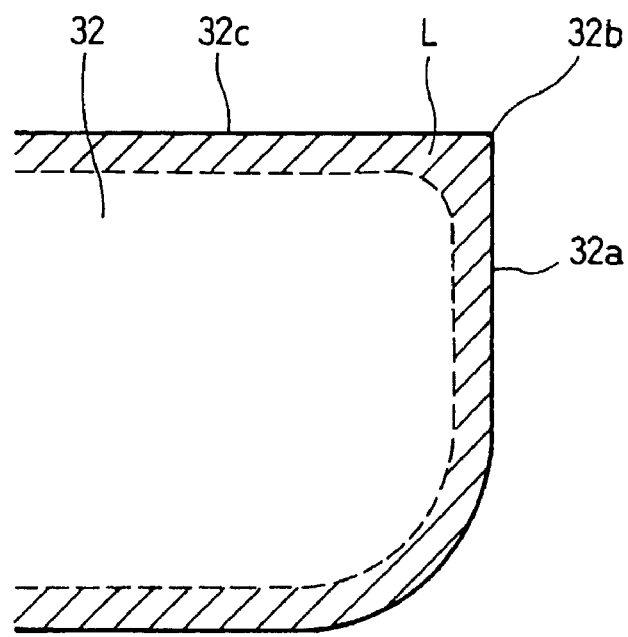
F I G. 5
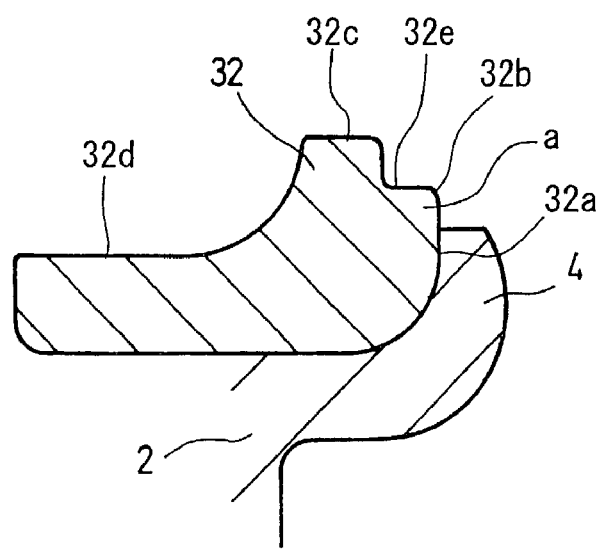

ROLLING BEARING UNIT

BACKGROUND OF THE INVENTION

This invention relates to a rolling bearing unit having a rolling bearing attached to the outer periphery of a shaft body such as a vehicle-use hub unit.

The vehicle-use hub unit, in general, has a hub wheel and a double row rolling bearing. The rolling bearing is mounted on the outer periphery of the shaft body of a hub wheel so as not to slip off the shaft body.

The shaft body of the hub wheel has on its free end side a cylindrical portion used for preventing the bearing from slipping off the shaft body. The cylindrical portion is bent and deformed outward in a radial direction using a caulking jig to be caulked onto an axial outer end face of an inner ring of the bearing. Thereby the cylindrical portion forms a caulking portion. The caulking portion prevents the bearing from slipping off the hub wheel. At the same time, a pre-load is applied from the caulking portion to the inner ring of the bearing. Carbon steel is used as the material of the inner ring of the bearing.

In order to enhance the life of the bearing, the inner ring is heat-treated to increase the strength of a raceway surface thereof.

SUMMARY OF THE INVENTION

When the rolling bearing unit is left for the purpose of storage or the like with the inner ring caulked onto the shaft body of the hub wheel, a phenomenon in which the inner ring is cracked and broken (hereinafter, referred to as season cracking) may be generated.

Accordingly, it is a main object of the invention to provide a rolling bearing unit preventing the generation of season cracking in the edge of an inner ring of a rolling bearing.

Other objects, features and advantages of the invention will be apparent from the following description.

In one aspect of the invention, this is accomplished by providing a rolling bearing unit comprising a shaft body, an inner ring and a fastening member. The inner ring is mounted on an outer peripheral surface of the shaft body. The inner ring is formed of carbon steel. The surface of the inner ring is heat treated and has a surface layer in which retained austenite exists. The fastening member is fastened to an axial outer end face of the inner ring for applying a tensile stress in an outer peripheral direction of the inner ring. The inner ring has an edge on an outside in a radial direction thereof. The surface layer is removed from the edge of the inner ring.

According to the rolling bearing unit of the invention, the surface layer, which causes season cracking, is removed from the edge of the inner ring. Therefore, the influence of a volume increase in the transformation of retained austenite into martensite, is reduced. As a result, the generation of the season cracking on the edge of the inner ring due to an increase in a tensile strength is prevented.

Preferably, the surface layer is removed from edge of the inner ring by polishing or turning. More preferably, an amount of the retained austenite existing in the edge of the inner ring is set between 3% or more and 20% or less by removing the surface layer.

BRIEF DESCRIPTION OF THE DRAWINGS FIGURE

These and other objects as well as advantages of the invention will become clear by the following description of preferred embodiments of the invention with reference to the accompanying drawings, wherein:

FIG. 4 is a view illustrating a surface layer generated on the surface of the inner ring of the rolling bearing unit; and FIG. 5 is a sectional view showing an inner ring of a rolling bearing unit according to another embodiment of the invention.

In all these figures, like components are indicated by the same numerals.

DETAILED DESCRIPTION

Figure 1:
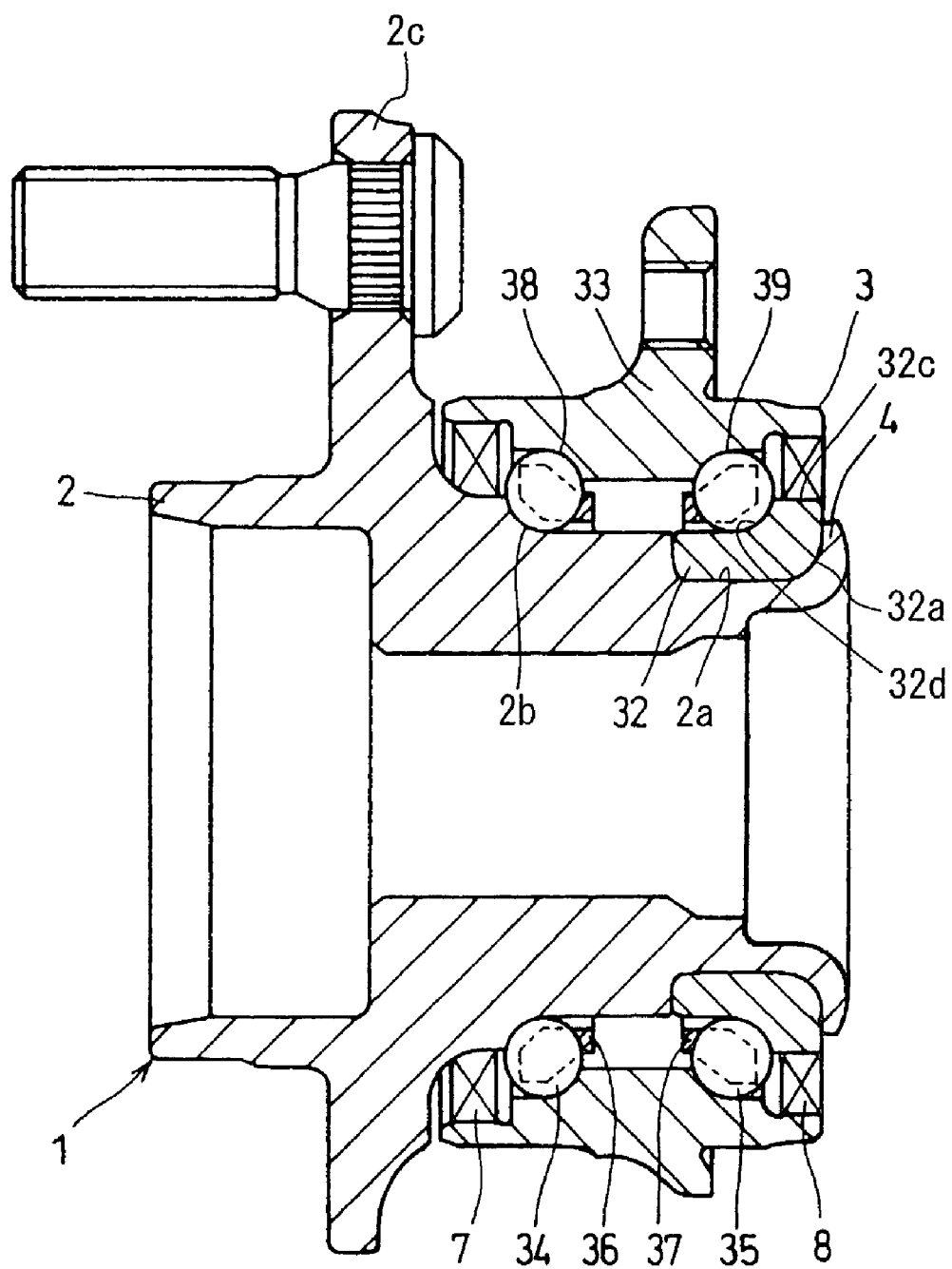
FIG. 1 is a sectional view showing a rolling bearing unit comprising a hub unit for a driving wheel according to an embodiment of the invention.

Referring now to the drawings, FIG. 1 illustrates a rolling bearing unit comprising a vehicle-use hub unit for a driving wheel according to a preferred embodiment of the invention. A hub wheel 1 on which a wheel is mounted has a shaft body 2 as a rotatable shaft. A double row rolling bearing 3, which is specifically an angular ball bearing as one example of rolling bearings, is pressed and fitted onto the outer peripheral surface of the shaft body 2 from the vehicle inner side.

The rolling bearing 3 has an inner ring 32. The inner ring 32 is attached to an annular groove 2a in the outer peripheral surface of the vehicle inner side of the shaft body 2. The inner ring 32 has an inner ring raceway 32d, while the shaft body 2 has an inner ring raceway 2b on the outer peripheral surface in the middle in an axial direction thereof. The inner ring raceway 2b constitutes a pair of inner ring raceways in the axial direction together with the inner ring raceway 32d of the inner ring 32. Moreover, the shaft body 2 has an outward radial flange 2c on the outer peripheral surface of the vehicle outer side thereof.

A tire wheel and a brake disk, not shown, are attached to a side of the vehicle outer side of the flange 2c. Furthermore, the rolling bearing 3 has an outer ring 33. The outer ring 33 is fixed to a vehicle body through a steering knuckle, not shown, and is provided with outer ring raceways 38 and 39 in two rows in the axial direction on the inner peripheral surface thereof.

The outer ring 33 is situated coaxially on the outside in the radial direction with respect to the inner ring 32. The rolling bearing 3 includes; balls 34 and 35 in two rows in the axial direction interposed between the inner ring raceways 32d and 2b and outer ring raceways 38 and 39; cages 36 and 37 in two rows in the axial direction which hold the balls 34 and 35; and seal rings 7 and 8 for sealing both ends in the axial direction of the rolling bearing 3.

A shaft end of the vehicle inner side of the shaft body 2 is bent and deformed outward in a radial direction and is caulked onto an outer end face 32a on the vehicle inner side of the inner ring 32, thereby forming a caulking portion 4. The caulking portion 4 as a fastening member applies an appropriate pre-load to the balls 34 and 35 and prevents the rolling bearing 3 from slipping from the shaft body 2.

Figure 2:
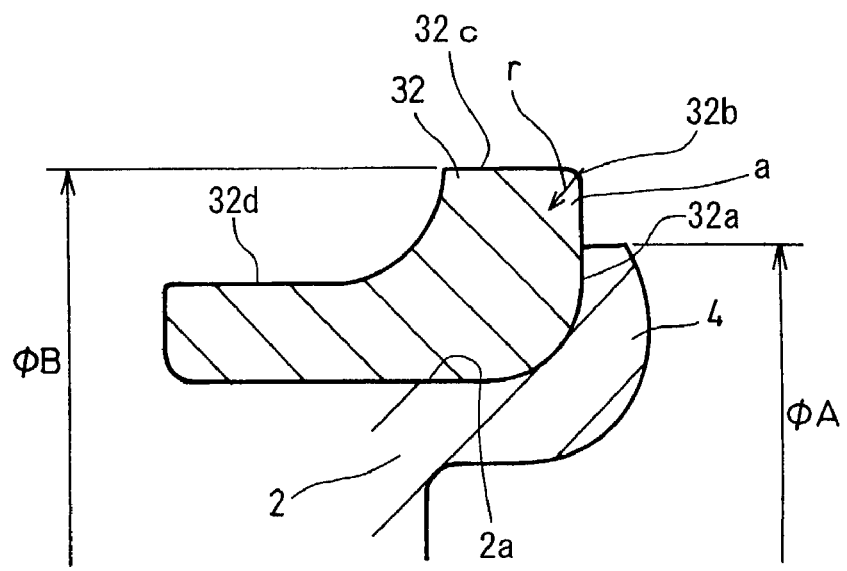
FIG. 2 is a sectional view showing an inner ring of the rolling bearing unit according to the embodiment of the invention.
Figure 3:
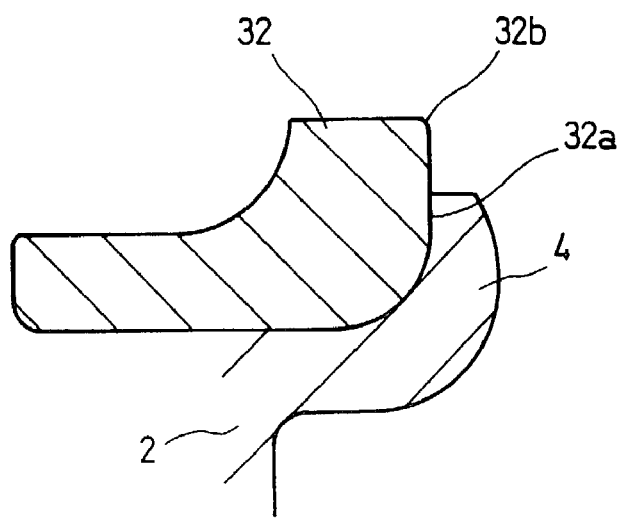
FIG. 3 is a sectional view showing an inner ring of a rolling bearing unit.

With reference to FIG. 2, carbon steel such as high carbon chromium steel (Japanese Industrial Standards SUJ2, bearing steel) or carbon steels for machine structural use (Japanese Industrial Standards S55C) is used for the material of the inner ring 32.

In order to increase the surface strength of the raceway 32d of the inner ring 32 to enhance the life of the bearing, the inner ring 32 is heat treated in a process for manufacturing the inner ring 32. The heat treatment is carried out in a slight carburizing atmosphere in order to prevent decarburization. Or the heat treatment is carried out in a carbonitriding atmosphere in which a small amount of $NH_3$ (ammonia gas) is added to an atmospheric gas.

As a result of an examination of season cracking, the following matters are considered. With reference to FIGS. 4 and 5, description will be given to the phenomenon in which the season cracking is generated. Numeral 32 denotes an inner ring and numeral 2 denotes a shaft body of a hub wheel. The end of the shaft body 2 is caulked onto an outer end face 32a on the end in the axial direction of the inner ring 32, thereby forming a caulking portion 4. A tensile stress in a circumferential direction is applied from the caulking portion 4 to a portion of the inner ring 32 in the vicinity of the caulking portion 4. Since the outer end face 32a of the inner ring 32 is held by the caulking portion 4, the tensile stress thereof converges on an outer diameter side edge 32b of the inner ring 32.

After the heat treatment of the inner ring, a surface layer L having an amount of retained austenite larger than other portions of the inner ring 32 is formed on the surface of the inner ring 32 as shown in FIG. 4.

An outer diameter side edge 32b of the outer end face 32a of the inner ring 32 is constituted by the outer end face 32a of the inner ring 32 and an outer peripheral surface 32c in a shoulder portion of the inner ring. In the surface layer L of the outer diameter side edge 32b, the retained austenite amount becomes larger than that of the other surface layer due to heating and carbon diffusion from the outer end face 32a and the outer peripheral surface 32c in the inner ring 32 during the heat treatment of the inner ring 32.

After the heat treatment, the retained austenite in the surface layer L is transformed into martensite, so that the volume of the surface layer L is increased.

Together with the tensile stress applied in the outer diameter side edge 32b of the inner ring 32, the increase in the volume of the surface layer L by the martensite results in an increase in a tensile stress. As a result the season cracking may be caused over the diameter side edge 32b of the inner ring 32.

As described above, it is considered that the retained austenite amount in the outer diameter side edge 32b of the inner ring 32 causes the generation of the season cracking phenomenon.

Thus, in order to prevent the season cracking, this invention proposes a rolling bearing unit capable of preventing the season cracking phenomenon by decreasing the retained austenite amount in the outer diameter side edge 32b of the inner ring 32.

Hereinafter, description will be given of a method of decreasing the retained austenite amount in the outer diameter side edge 32b of the inner ring 32.

According to a first method, in view of a point that the retained austenite amount in the surface layer L gradually decreases from the surface of the inner ring to the inside, the surface layer L in the outer diameter side edge 32b of the inner ring 32 is removed until a predetermined depth by polishing or turning, thereby decreasing the retained austenite amount in the outer diameter side edge 32b.

Accordingly, in the outer diameter side edge 32b, the surface layer L is removed such that the retained austenite amount becomes between 3% or more and 20% or less in the range a in which at least tensile stress converges, thereby reducing the percentage of generation of the season cracking in the inner ring 32.

A concrete range a is determined as follows.

The range a in a radius r, in which the surface layer is removed from the edge 32b, satisfies the following expression:

$$(\phi B - \phi A)/2 \geq r \geq D$$

wherein $\phi A$ represents an outer diameter of the caulking portion 4, $\phi B$ represents an outer diameter of the outer peripheral surface 32c in the shoulder portion of the inner ring 32, r represents a radius from the edge 32b of the inner ring 32 in the vicinity of the caulking portion 4, and D (mm) represents a numeric value which is almost equal to the thickness of the surface layer in which an amount of retained austenite which generates on the surface of the inner ring 32 is much more than that of other portions of the inner ring (for example, 20% or more). The thickness of the surface layer is preferably 0.5 mm.

By removing the surface layer present within the range satisfying the expression by the radius r from the edge 32b of the inner ring 32, thus, retained austenite amount on the edge 32b is between 3% or more and 20% or less, preferably between 5% or more and 15% or less, more preferably between 5% or more and 10% or less.

When the retained austenite amount was equal to or less than 20%, the season cracking was not generated after the passage of the days. When the retained austenite amount was 23%, the season cracking was generated on a tenth day. When the retained austenite amount was 30%, the season cracking was generated on a seventh day.

According to the rolling bearing unit thus constituted, the retained austenite amount is set between 3% or more and 20% or less within the range of the radius r satisfying the expression from the edge 32b of the inner ring 32 so that the influence of a volume dilatation can be reduced in the transformation of the retained austenite into martensite. As a result, it is possible to prevent the season cracking from being generated on the edge 32b of the inner ring 32 due to an increase in a tensile stress caused by the caulking portion 4. Consequently, the reliability of the bearing can be enhanced.

The invention is not restricted to the embodiment in which the edge 32b of the inner ring 32 is subjected to the polishing or the turning to set the retained austenite amount in the edge 32b to be between 3% or more and 20% or less but the retained austenite amount in the edge 32b may be set between 3% or more and 20% or less by the optimization of heat-treating conditions in the process for manufacturing the inner ring 32.

Conventional heat-treating conditions are as follows. More specifically, the inner ring 32 is put in a heat treat furnace. At this time, the internal temperature of the heat treating furnace is set to 850° C. to 930° C. The heat treating time for the inner ring 32 is set to five hours. A carbon concentration C.P (Carbon.Potential) in the heat treat furnace is set to 1.1 to 1.4%, and an ammonia concentration is set to 7 to 11 CFH. The CFH represents $ft^3/H$ (cubic foot per hour). Then, the internal temperature of the heat treat furnace is dropped to 800° C. to 830° C. and the temperature dropping state is kept for 30 minutes. After that the inner ring 32 is taken out of the heat treat furnace and is then thrown into the oil kept at temperatures of 60° C. to 100° C. to be quenched (oil cooling). After the oil cooling, the inner ring 32 is tempered again for two hours in a heat treat furnace having an internal temperature of 160° C. to 200° C. Subsequently, the inner ring 32 is taken out of the heat treating furnace and is air cooled.

In the invention, the conventional heat-treating conditions for the inner ring 32 are improved. More specifically, the inner ring 32 is put in the heat treat furnace. At this time, the internal temperature of the heat treating furnace is set to 850° C. to 930° C. The heat treating time of the inner ring 32 is set to five hours. A carbon concentration C.P in the heat treating furnace is set to 0.9 to 1.1%, and an ammonia concentration is set to 4 to 7 CFH. Then, the internal temperature of the heat treat furnace is dropped to 800° C. to 830° C. The temperature dropping state is held for 30 minutes. Thereafter the inner ring 32 is then taken out of the heat treat furnace and is thereafter put into oil kept at temperatures 60° C. to 100° C. to be quenched (oil cooling). After the oil cooling, the inner ring 32 is tempered again for two hours in a heat treat furnace having an internal temperature of 160° C. to 200° C. Subsequently, the inner ring 32 is taken out of the heat treating furnace and is air cooled.

In the invention, thus, the carbon concentration and the Ammonia concentration in the heat-treating conditions are improved so that the retained austenite amount in the edge 32b can be set between 3% or more and 20% or less without polishing or turning the edge 32b of the inner ring 32.

The invention is not restricted to the inner ring 32 having the structure described in the embodiment. For example, as shown in FIG. 5, a step 32e having a diameter reduced is provided on the vehicle inner side end of the shoulder portion of the inner ring 32, and the step 32e is set to be the installation space of a rotating speed sensor and the vehicle inner side end of the step 32e is set to be the edge 32b. The retained austenite amount within the range of the radius r satisfying the expression may be set between 3% or more and 20% or less in the edge 32b.

In the invention, a fastening member is not restricted to the caulking portion 4 in the embodiment but may be a nut screwed to the shaft body 2 and fastened to an outer end face in the axial direction of the inner ring 32. In brief, the shaft body 2 includes a fastening member which is fastened to the outer end face in the axial direction of the inner ring 32 and applies a tensile stress in the outer peripheral direction of the inner ring 32.

The invention is not restricted to the hub unit comprising a combination of the hub wheel and the angular ball bearing in the embodiment but the hub wheel or the like may be set to be the shaft body and a rolling bearing such as an angular ball bearing may be applied to various rolling bearing units provided on the outer periphery of the shaft body.

What is claimed is:

1. A rolling bearing unit comprising:
   a shaft body;
   an inner ring mounted on an outer peripheral surface of the shaft body and having an inner ring raceway, the inner ring being formed of carbon steel and retained austenite resulting from heat treatment; and
   a fastening member fastened to an outer end face in an axial direction of the inner ring and applying a tensile stress in an outer peripheral direction of the inner ring,
   wherein the inner ring has an edge on an outside in a radial direction thereof and an amount of the retained austenite in the edge is at least 3% and less than 20% and less than a remaining portion of the inner ring including the inner ring raceway.

2. A rolling bearing unit according to claim 1, wherein the fastening member is a caulking portion formed by caulking an end of the shaft body onto the outer end face of the inner ring.

3. A rolling bearing unit according to claim 2, wherein the caulking portion is in contact with the edge of the inner ring.

4. A rolling bearing unit according to claim 1, wherein the inner ring has a shoulder portion having a step on a vehicle inner side end thereof and the step is adapted to accommodate a rotating speed sensor, and the vehicle inner side end of the step is set to be the edge.

5. A rolling bearing unit according to claim 1, wherein an amount of the retained austenite in the edge is between 5% and 15%.

6. A rolling bearing unit according to claim 1, wherein an amount of the retained austenite in the edge is between 5% and 10%.

7. A rolling bearing unit according to claim 1, wherein an amount of the retained austenite in the edge is 15% or less.

8. A rolling bearing unit according to claim 1, wherein the inner ring has a flat shoulder portion extending radially outward from the inner ring raceway and a step extending radially inward from the edge, the step being offset relative to the flat shoulder portion.

9. A rolling bearing unit comprising:
   a shaft body;
   an inner ring mounted on an outer peripheral surface of the shaft body and having an inner ring raceway, the inner ring being formed of carbon steel; and
   a fastening member fastened to an outer end face in an axial direction of the inner ring for applying a tensile stress in an outer peripheral direction of the inner ring,
   wherein the inner ring has an edge on an outside in a radial direction thereof, and an amount of retained austenite existing in at least the edge is at least 3% and less than 20% and less than a remaining portion of the inner ring including the inner ring raceway.

10. A rolling bearing unit according to claim 9, wherein the inner ring has a shoulder portion having a step on a vehicle inner side end thereof and the step is adapted to accommodate a rotating speed sensor, and the vehicle inner side end of the step is set to be the edge.

11. A rolling bearing unit according to claim 9, wherein an amount of the retained austenite in the edge is between 5% and 15%.

12. A rolling bearing unit according to claim 9, wherein an amount of the retained austenite in the edge is 15% or less.

13. A rolling bearing unit according to claim 9, wherein an amount of the retained austenite in the edge is between 5% and 10%.

14. A rolling bearing unit comprising:
   a shaft body;
   an inner ring mounted on an outer peripheral surface of the shaft body and having an inner ring raceway, the inner ring being formed of carbon steel and subjected to a heat treatment for increasing a surface hardness thereof including the inner ring raceway; and
   a plurality of balls interposed between the inner ring and an outer ring disposed coaxially on an outside in a radial direction with respect to the inner ring,
   wherein the shaft body is provided with a caulking portion caulked onto an outer end face in an axial direction of the inner ring so that a pre-load is applied to the balls and the inner ring is fixed to the shaft body, and
   the inner ring has an edge on an outside in a radial direction in the vicinity of the caulking portion and an amount of retained austenite existing in the edge is at least 3% and less than 20% and less than a remaining portion of the inner ring including the inner ring raceway.

15. A rolling bearing unit according to claim 14, wherein an amount of the retained austenite in the edge is between 5% and 15%.

16. A rolling bearing unit according to claim 14, wherein an amount of the retained austenite in the edge is 15% or less.

17. A rolling bearing unit according to claim 14, wherein an amount of the retained austenite in the edge is between 5% and 10%.

18. A rolling bearing unit comprising:
a shaft body;
an inner ring mounted on an outer surface of the shaft body and having an inner ring raceway; and
a fastening member fastened to an outer end face in an axial direction of the inner ring,
wherein the inner ring has an edge on an outside in a radial direction thereof and an amount of retained austenite is at least 3% and less than 20% in the edge and less than a remaining portion of the inner ring including the inner ring raceway.

19. A rolling bearing unit according to claim 18, wherein an amount of the retained austenite in the edge is between 5% and 15%.

20. A rolling bearing unit according to claim 18, wherein an amount of the retained austenite in the edge is between 5% and 10%.

* * * * *